(12) United States Patent
Bernat et al.

(10) Patent No.: US 9,626,299 B2
(45) Date of Patent: Apr. 18, 2017

(54) CHANGING A HASH FUNCTION BASED ON A CONFLICT RATIO ASSOCIATED WITH CACHE SETS

(71) Applicant: Intel Corporation, Santa Clara, CA (US)

(72) Inventors: Francesc Guim Bernat, Barcelona (ES); Alejandro Duran Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 14/701,911

(22) Filed: May 1, 2015

(65) Prior Publication Data

US 2016/0321187 A1    Nov. 3, 2016

(51) Int. Cl.
*G06F 12/00* (2006.01)
*G06F 12/1018* (2016.01)
*G06F 12/0875* (2016.01)
*G06F 12/128* (2016.01)

(52) U.S. Cl.
CPC ...... *G06F 12/1018* (2013.01); *G06F 12/0875* (2013.01); *G06F 12/128* (2013.01); *G06F 2212/621* (2013.01); *G06F 2212/657* (2013.01); *G06F 2212/69* (2013.01)

(58) Field of Classification Search
None
See application file for complete search history.

(56) References Cited

U.S. PATENT DOCUMENTS

| | | | | |
|---|---|---|---|---|
| 6,138,209 A | * | 10/2000 | Krolak | G06F 12/0864 711/122 |
| 8,595,441 B1 | * | 11/2013 | Nakibly | G06F 9/544 711/130 |
| 9,058,284 B1 | * | 6/2015 | Ben-Meir | G06F 12/10 |
| 2010/0250856 A1 | * | 9/2010 | Owen | G06F 12/084 711/128 |

\* cited by examiner

*Primary Examiner* — Baboucarr Faal
(74) *Attorney, Agent, or Firm* — Lowenstein Sandler LLP

(57) ABSTRACT

Data and a memory address associated with the data may be received. A hash value of the memory address may be calculated by using a first hash function. The data may be stored at a cache set of a plurality of cache sets of a cache memory based on the hash value calculated from the first hash function. A determination may be made as to whether the storing of the data at the cache set of the plurality of cache sets of the cache memory is associated with a conflict ratio of the cache memory exceeding a threshold ratio. In response to the conflict ratio exceeding the threshold ratio, a second hash value of a second memory address associated with a second data may be calculated by using a second hash function that is different than the first hash function.

23 Claims, 12 Drawing Sheets

CHANGING A HASH FUNCTION BASED ON A CONFLICT RATIO ASSOCIATED WITH CACHE SETS

TECHNICAL FIELD

Embodiments described herein generally relate to cache sets and, more specifically, relate to changing a hash function based on a conflict ratio associated with cache sets.

BACKGROUND

A processing device may be based on an architecture that includes a cache memory. A processor core of the processing device may store data in the cache memory. For example, data and memory addresses may be stored in the cache memory. Furthermore, the cache memory may be divided or made of cache sets, or blocks, that each contain a number of lines, or ways, to store data and memory addresses. Each data and corresponding memory address may be stored in one of the cache sets.

DESCRIPTION OF EMBODIMENTS

Figure 1:
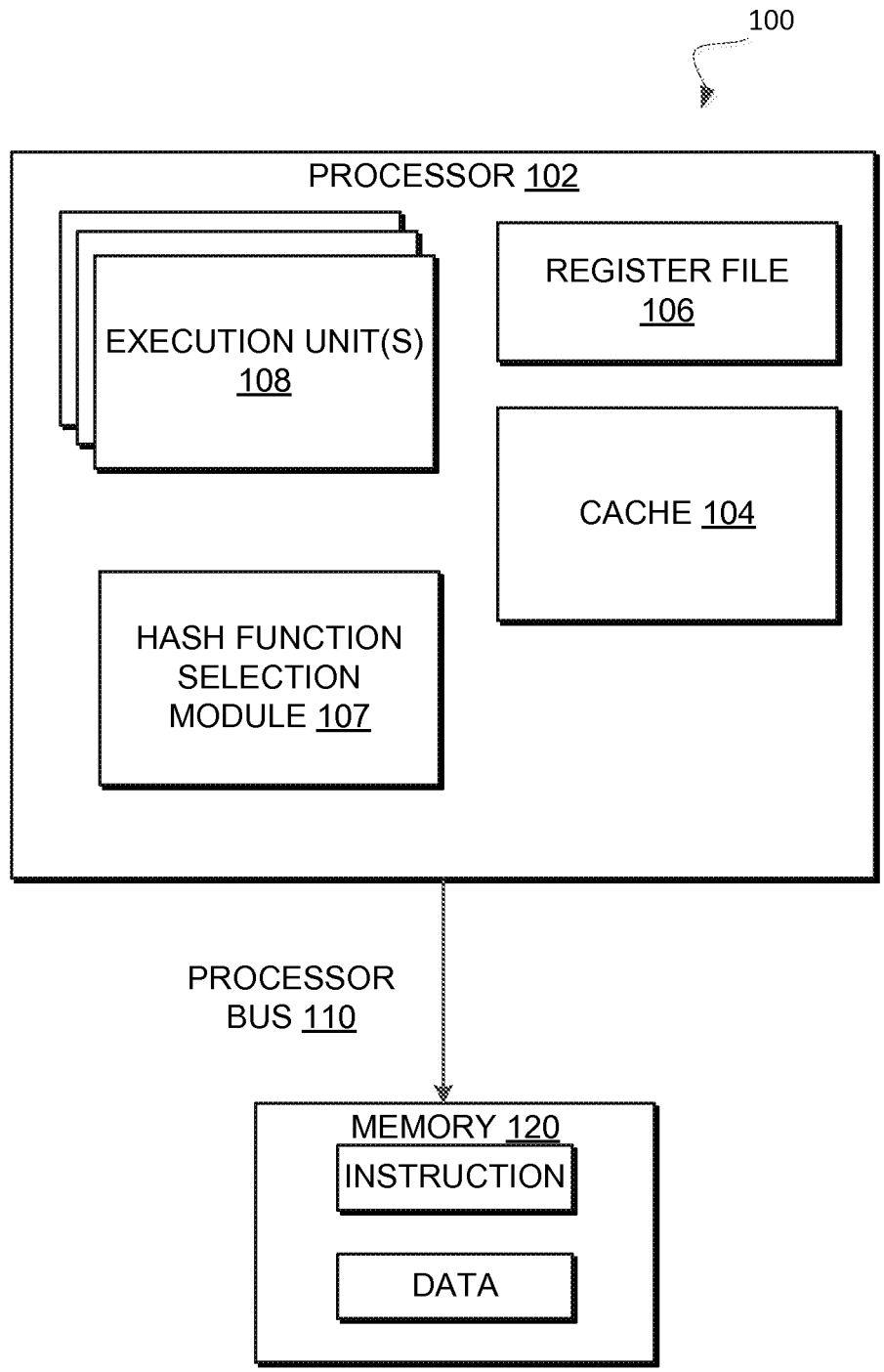
FIG. 1 is a block diagram illustrating a computing system that implements a hash function selection module to change a hash function used to store memory data in a cache set in accordance with some embodiments.

Aspects of the present disclosure are directed to changing a hash function based on a conflict ratio associated with cache sets in a processing architecture. For example, the hash function may be used to determine a cache set of the cache memory to store memory data and corresponding memory addresses. The changing of the hash function may be used to improve the performance of a processor, processing device, or a processor-based system. For example, the performance of a processing device may be improved by changing a hash function that is used to compute or determine a particular cache set that will be used to store data in cache sets of a cache memory when a conflict ratio associated with the cache sets exceeds a threshold value. A processing device may include a processor core, a hash function selection module, and a memory. The processor core may receive memory data and corresponding memory addresses. A cache memory may be used to store the memory data and the corresponding memory addresses. For example, each memory data and its corresponding memory address (or a portion of its address as described in further detail below) may be stored in one of multiple cache sets that make up the cache memory. For example, the memory data and the corresponding memory addresses may be stored in one of the cache sets. However, if the storing of new memory data in one of the cache sets exceeds the capacity of the cache set (e.g., the cache set already stores other memory data and corresponding memory addresses), then at least one currently stored memory data and its corresponding memory address may be evicted, or removed, from the cache set so that the new memory data and its corresponding memory address may be stored in the cache set. The eviction of the other memory data and its corresponding memory address may result in the removal of the other memory data and its corresponding memory address from the cache memory to a main memory. Such an eviction or removal of memory data from a cache set may be referred to as a conflict. If the amount of conflicts, or a conflict ratio (e.g., the number of conflicts per memory data stored in the cache sets), is excessive, then the performance of the processing device may be reduced.

Modern microprocessor-based products, including a System on a Chip (SoC), clients, servers, and hardware accelerators, may utilize a cache memory divided into cache sets. For example, a cache memory may be divided into multiple cache sets where each cache set has a capacity to store a number of memory data or rows. As memory data is received to be stored in the cache memory, the memory data and its corresponding memory address may be stored in one of the multiple cache sets. However, if the memory data and corresponding memory addresses are being stored in one cache set or a subset of the cache sets of the cache memory and not in other cache sets (e.g., an uneven distribution of storing the memory data in the cache sets), then conflict ratio associated with the cache sets may be excessive as some of the cache sets may become full and the storing of additional memory data in the full cache set may result in the eviction of other memory data from the full cache set to the main memory. However, the other cache sets may be underutilized. Thus, the uneven distribution of the storing of the memory data in particular cache sets may result in a higher conflict ratio for storing the memory data in the cache memory, which may result in decreased performance for a processing device.

An algorithm may be used to determine which cache set of multiple cache sets of the cache memory data should be stored in. For example, the algorithm may be a hash function and a first memory data may be received and the hash function may calculate a first hash value based on the memory address of the first memory data. The results of the hash function calculating the first hash value may be used to determine to store the first memory data and its corresponding first hash value in one of the cache sets. A second memory data may be received and the hash function may calculate a second hash value based on the memory address of the second memory data. Similarly, the second memory data may also be stored in one of the cache sets based on the results of the hash function. The hash function may map digital data (e.g., the memory address) to digital data of a fixed size (e.g., the hash value which may be referred to as a portion of the memory address). However, the hash function may result in an uneven distribution of the memory data in a subset of the cache sets, thus resulting in an increased conflict ratio.

In some embodiments, a hash function selection module may be used to change the hash function that is used to determine which cache set received memory data should be stored in. For example, the assigning or storing of the first memory data in a first cache set based on a first hash function may result in an eviction of other memory data in the first cache set so that a conflict ratio (e.g., the number of times memory data is evicted per amount of memory data stored in the cache sets) exceeds a threshold ratio. In response to the conflict ratio exceeding the threshold ratio, the hash function selection module may change the hash function that is used to determine which cache set the received memory should be stored in. For example, for a second memory data that is subsequently received, a second hash function that is different than the first hash function may be used. Since the second hash function is different than the first hash function, the distribution of the memory data among the cache sets may be different and may result in the storing of the second memory data in another cache set that may have been underutilized when the first hash function was used to store memory data in the cache sets.

Such changing of the hash function used to assign or store memory data in cache sets of a cache memory may improve the overall performance of a processing device. For example, the changing of the hash function may distribute the memory data more evenly among the cache sets and decrease the conflict ratio associated with the cache sets. Therefore, the performance of the processing device using a hash function selection module may be improved by changing the hash function used to assign or store memory data in cache sets, resulting in fewer evictions of other memory data stored in the cache sets.

FIG. 1 is a block diagram illustrating a computing system 100 that implements a hash function selection module 107 for selecting a hash function that is used to assign or store memory data in cache sets in accordance with some embodiments. The computing system 100 is formed with a processor 102 that includes one or more execution units 108 to execute an operation or instruction in accordance with one or more embodiments as described herein. In some embodiments, one or more of the execution units 108 may perform the functionality of a hash function selection module 107. In short, the hash function selection module 107 is used by the processor 102 to identify a cache set of the cache memory 104. For example, the hash function selection module 107 may select a hash function to identify a cache set of the cache memory 104 to store received memory data and may change the hash function based on a conflict ratio exceeding a threshold ratio. Additional details with regard to the hash function selection module 107 are described in more detail below with respect to FIGS. 2-6.

Computing system 100 includes a component, such as a processor 102, to employ execution units 108 including logic to perform algorithms for processing data in accordance with the embodiments described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes, and the like) may also be used. In one embodiment, sample computing system 100 executes a version of the WINDOWS™ operating system available from Microsoft Corporation of Redmond, Wash., although other operating systems (e.g., UNIX and Linux), embedded software, and/or graphical user interfaces may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Examples of handheld devices include, but are not limited to, cellular phones, Internet Protocol devices, digital cameras, personal digital assistants (PDAs), and handheld PCs. Embedded applications may include, but are not limited to, a micro controller, a digital signal processor (DSP), system on a chip (SoC), network computers (NetPC), set-top boxes, network hubs, wide area network (WAN) switches, or any other system that can perform one or more instructions in accordance with at least one embodiment.

In the illustrated embodiment of FIG. 1, processor 102 includes one or more execution units 108 to implement an algorithm that is to perform at least one instruction or operation. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, an out of order based processor, or any other processor device, such as a digital signal processor, for example. The processor 102 is coupled to a processor bus 110 that transmits data signals between the processor 102 and other components in the system 100, such as main memory 120 storing instruction, data, or any combination thereof. The other components of the system 100 may include, but are not limited to, a graphics accelerator, a memory controller hub, an I/O controller hub, a wireless transceiver, a Flash BIOS, a network controller, an audio controller, a serial expansion port, and an I/O controller. These elements perform their conventional functions that are well known to those familiar with the art.

In one embodiment, the processor 102 includes a Level 1 (L1) internal cache memory 104. Depending on the architecture, the processor 102 may have a single internal cache memory or multiple levels of internal cache memories (e.g., L1 and L2). Other embodiments include a combination of both internal and external caches depending on the particular implementation and needs. Register file 106 is to store different types of data in various registers including, but not limited to, integer registers, floating point registers, vector registers, banked registers, shadow registers, checkpoint registers, status registers, configuration registers, and instruction pointer registers.

Execution unit 108, including logic to perform integer and floating point operations, also resides in the processor 102. It should be noted that the execution unit may or may not have a floating point unit. The processor 102, in one embodiment, includes a microcode (μcode) ROM to store microcode, which when executed, is to perform algorithms for certain macroinstructions or handle complex scenarios. Here, microcode is potentially updateable to handle logic bugs/fixes for processor 102. Alternative embodiments of an execution unit 108 may also be used in micro controllers, embedded processors, graphics devices, DSPs, and other types of logic circuits.

System 100 includes a main memory 120. Main memory 120 may include, but is not limited to, a dynamic random access memory (DRAM) device, a static random access memory (SRAM) device, flash memory device, or other memory device. Main memory 120 stores instructions and/or data represented by data signals that are to be executed by the processor 102. The processor 102 is coupled to the main memory 120 via a processor bus 110. A system logic chip, such as a memory controller hub (MCH) may be coupled to the processor bus 110 and main memory 120. An MCH can provide a high bandwidth memory path to memory 120 for instruction and data storage and for storage of graphics commands, data and textures. The MCH can be used to direct data signals between the processor 102, main memory 120, and other components in the system 100 and to bridge the data signals between processor bus 110, main memory 120, cache memory 104, and system I/O, for example. The MCH may be coupled to main memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the main memory 120, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the hash function selection module 107 may be used with a system on a chip. The memory for one such system may be a flash memory. The flash memory may be located on the same die as the processor and other system components. Additionally, other logic blocks, such as a memory controller or graphics controller, may also be located on a system on a chip.

Figure 2:
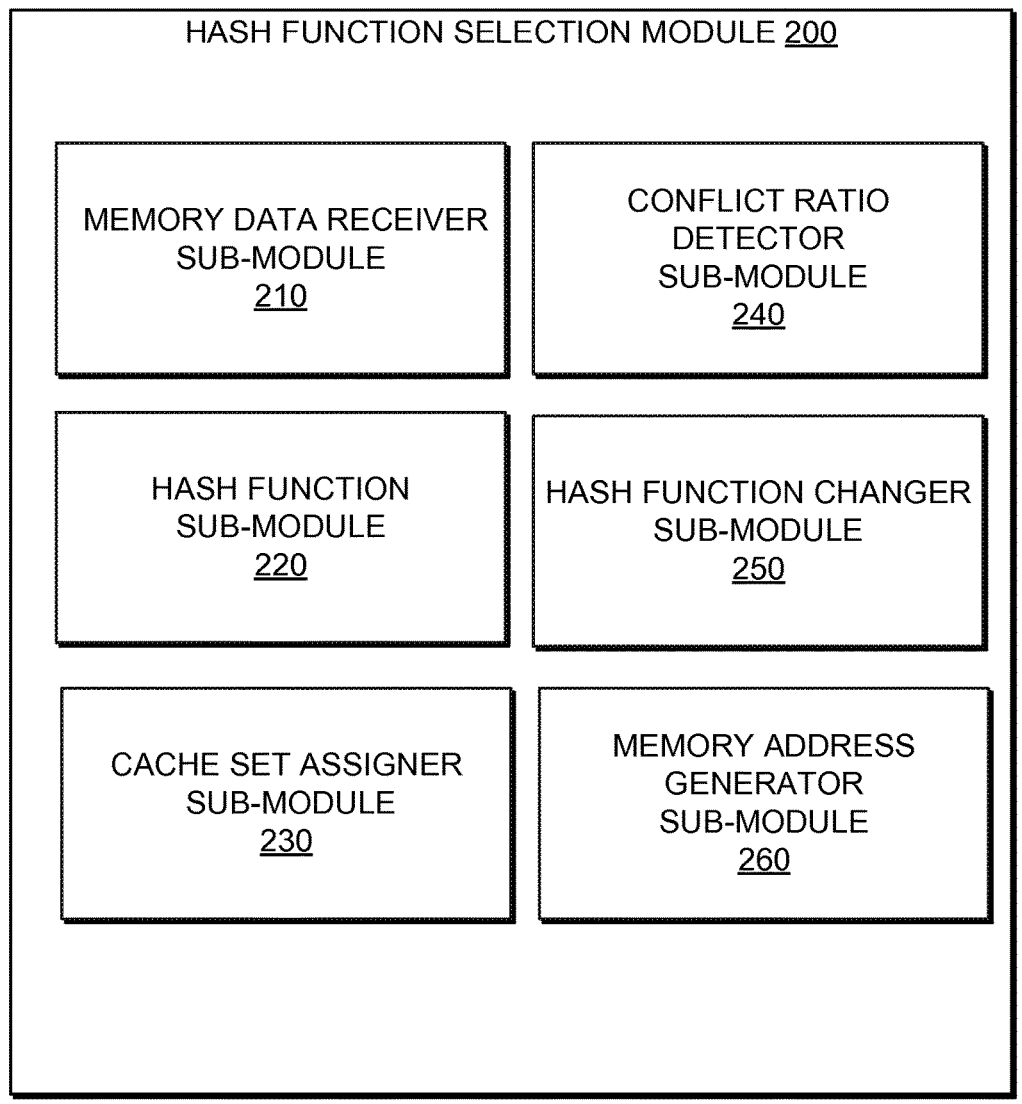
FIG. 2 is a block diagram illustrating a hash function selection module in accordance with some embodiments of the disclosure.

FIG. 2 is a block diagram illustrating an example hash function selection module 200 in accordance with some embodiments of the disclosure. The hash function selection module 200 may correspond to the hash function selection module 107 of FIG. 1. In general, the hash function selection module 200 may include a memory data receiver sub-module (or function block) 210, a hash function sub-module (or function block) 220, a cache set assigner sub-module (or function block) 230, a conflict ratio detector sub-module (or function block) 240, a hash function changer sub-module (or function block) 250, and a memory address generator sub-module (or function block) 260. In alternative embodiments, the functionality of one or more of the sub-modules may be combined or divided. For example, a single sub-module may perform the functionality of the memory data receiver sub-module 210, hash function sub-module 220, cache set assigner sub-module 230, conflict ratio detector sub-module 240, hash function changer sub-module 250, and the memory address generator sub-module 260. Alternatively, the functionality of each of the sub-modules 210, 220, 230, 240, 250, and 260 may be separated between multiple sub-modules.

As shown in FIG. 2, the hash function selection module 200 may include a memory data receiver sub-module 210 that may receive memory data and corresponding memory addresses (e.g., physical addresses) of the memory data. For example, the memory data that is received may be memory data that is to be stored in a cache memory. In some embodiments, the memory data may be stored in one cache set of multiple cache sets that are part of the cache memory. A cache set may refer to a portion or a block of the cache memory. Each cache set may include a number of lines, also referred to as ways that are used to store memory data. For example, a cache memory may be referred to as an n-way set associative cache memory where each of the cache sets of the cache memory includes n cache lines to store memory data. Thus, as an example, a 1 megabyte cache memory may include ten cache sets of 100 kilobytes in size. The cache memory may be an 4-way set associative cache memory so that each of the ten cache sets includes 4 lines or entries that are used to store memory data and corresponding portions of memory addresses.

The hash function sub-module 220 may apply a hash function to a physical memory address or a portion of the memory address of the received memory data. For example, a first hash function may receive the memory address of the received memory data and may calculate a first hash value. The cache set assigner sub-module 230 may assign the memory data to one of the cache sets of the cache memory. For example, the memory data may be assigned to one of the cache sets based on the first hash value. In some embodiments, the hash function sub-module 220 may receive the memory address and may provide an output between a value of 0 and a number based on the number of cache sets that are included in the cache memory. For example, if the cache memory includes ten cache sets, then the hash function may provide a value from 0 (e.g., identifying the first cache set) to 9 (e.g., identifying the last or tenth cache set). For example, a number of bits of the hash value may be extracted to provide the value from 9 to 9. Furthermore, the cache set assigner sub-module 230 may assign the received memory data and a portion of its corresponding memory address to the cache set based on the results of the hash function. For example, the hash function may perform a calculation on the memory data and may identify that the memory address and a portion of its corresponding memory data (e.g., a hash portion) is to be stored in a particular cache set of the multiple cache sets of the cache memory. In some embodiments, the memory data may be assigned to a cache set based on a portion of the hash value. For example, a memory address may be hashed to provide a hash value and a portion of the bits of the hash value may be used to assign the memory data corresponding to the memory address to a particular cache set.

Furthermore, the conflict ratio detector sub-module 240 may identify whether a conflict ratio associated with storing the memory data in the particular cache set exceeds a threshold value or threshold ratio. For example, when memory data is stored in one of the cache sets, the conflict ratio detector sub-module 240 may determine if the storing of the memory data in the cache set has resulted in the eviction or removal of other memory data that was previously stored in the cache set. If the evicting of the previous memory data results in the conflict ratio of the cache sets of the cache memory exceeding a threshold value, then the hash function that is used to assign memory data to the cache sets may be changed. The conflict ratio may refer to a number of times that an eviction occurs in a cache set when memory data is assigned to any of the cache sets per total number of times that the memory data is assigned to any of the cache sets. For example, if there is one eviction of memory data from any cache set of multiple cache sets of a cache memory per ten times that memory data is assigned to any of the multiple cache sets of the cache memory, then the conflict ratio may be 10% (e.g., one memory data eviction per ten memory data assignments). If the conflict ratio exceeds a threshold ratio value or number, then the conflict ratio may be considered to exceed the threshold ratio. For example, if the threshold ratio is 5%, then the conflict ratio of 10% is considered to exceed the threshold ratio that is 5%.

The hash function changer sub-module 250 may change the hash function that is used to assign memory data to the cache sets based on the conflict ratio. For example, if the conflict ratio is detected to exceed the threshold ratio, then the hash function used by the hash function sub-module 220 may be changed to another hash function. However, if the conflict ratio is not detected to exceed the threshold ratio, then the hash function that is used by the hash function sub-module 220 may not be changed.

Referring to FIG. 2, the hash function selection module 200 may include a memory address generator sub-module 260. In some embodiments, the memory address generator sub-module 260 may regenerate or reconstruct a memory address of memory data that is to be evicted from a cache set. For example, the memory address generator sub-module may identify a hash function identifier corresponding to a hash function that was used to generate a portion of the memory address that is stored with the memory data to be evicted. The memory address generator sub-module 260 may reconstruct or calculate the original memory address of the memory data based on the portion of the memory address, the number of the cache set that the memory data was assigned to, and the hash function corresponding to the hash function identifier. Further details with regard to calculating the original memory address in response to an eviction are described in conjunction with FIG. 4.

Figure 3:
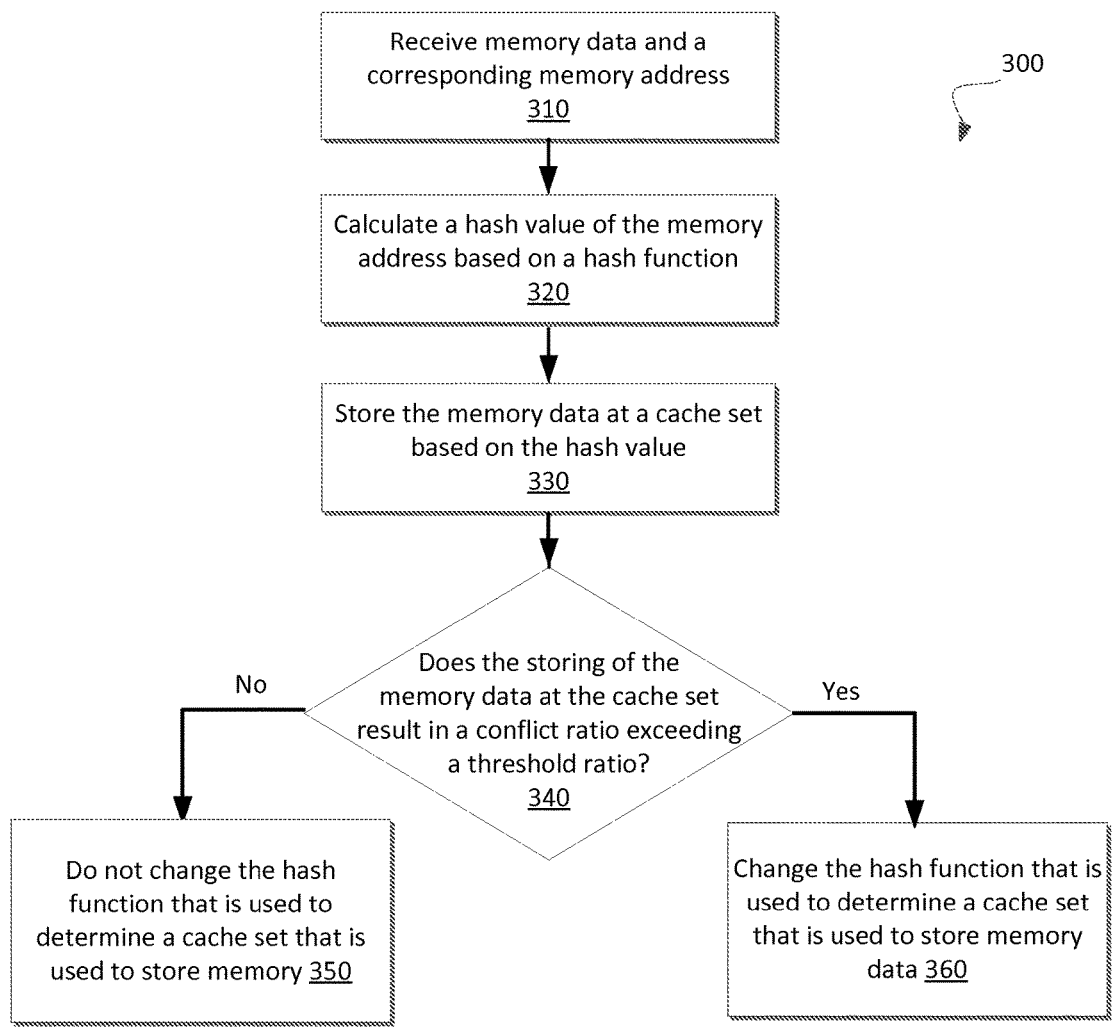
FIG. 3 is a flow diagram of a method to change a hash function used to store memory data in cache sets based on a conflict ratio in accordance with some embodiments.

FIG. 3 is a flow diagram of a method 300 to change a hash function used to store memory data in cache sets based on a conflict ratio. The method 300 may be performed by the hash function selection module 107 or 200. For example, the method 300 may be used by the hash function selection module 107 of FIG. 1 or the hash function selection module 200 of FIG. 2 to determine when to change from a first hash function for assigning memory data to cache sets to a second hash function for assigning memory data to the cache sets. The method 300 may also be performed by processing logic that may comprise hardware (e.g., circuitry, dedicated logic, programmable logic, microcode, etc.), software, firmware, or a combination thereof. Alternatively, other components of the computing system 100 may perform some or all of the operations of the method 300.

As shown in FIG. 3, the method 300 may begin with the processing logic receiving, at block 310, a memory data and a corresponding memory address. For example, the memory data may be memory data that is to be stored in cache memory. Furthermore, the corresponding memory address may be a physical address of the memory data. The processing logic may calculate a hash value of the memory address based on a hash function (block 320). For example, the hash function may be used to calculate a hash value based on the memory address. The processing logic may further store the memory data at a cache set based on the hash value (block 330). For example, the hash value may be used to select or determine the cache set. In some embodiments, the hash value may also be stored at the cache set with the memory data. For example, a cache set of multiple cache sets of the cache memory may be identified based on the hash value. For example, the cache set may be identified based on a portion or a number of bits of the hash value. The portion or the number of bits may correspond to one of the cache sets. For example, the portion or the number of bits may correspond to a number that is assigned to one of the cache sets (e.g., a first number to identify a first cache set, a second number to identify a second cache set, etc.). The processing logic may determine if the storing of the memory data at the cache set results in a conflict ratio exceeding a threshold ratio (block 340). For example, the storing of the memory data at a particular cache set may result in the eviction or removal of another memory data that is currently stored at the particular cache set. If the rate of evictions or removal of memory data from any of the cache sets of the cache memory exceeds a threshold amount, then the conflict ratio may be considered o exceed the threshold ratio or threshold amount. If the conflict ratio does not exceed the threshold ratio, then the processing logic may not change the hash function that is used to determine the cache set that is to store memory data in the cache sets (block 350). For example, the same hash function may be used to assign subsequently received memory data that is to be stored in the cache memory in one of the cache sets. However, if the conflict ratio does exceed the threshold ratio, then the processing logic may change the hash function that is used to determine the cache set that is used to store memory data in the cache sets (block 360). For example, another hash function may be used for assigning subsequently received memory data that is to be stored in the cache memory to one of the cache sets. As such, a hash function that is used to assign memory data to the cache sets of a cache memory may be changed in response to a conflict ratio of the cache memory exceeding a threshold ratio.

Figure 4:
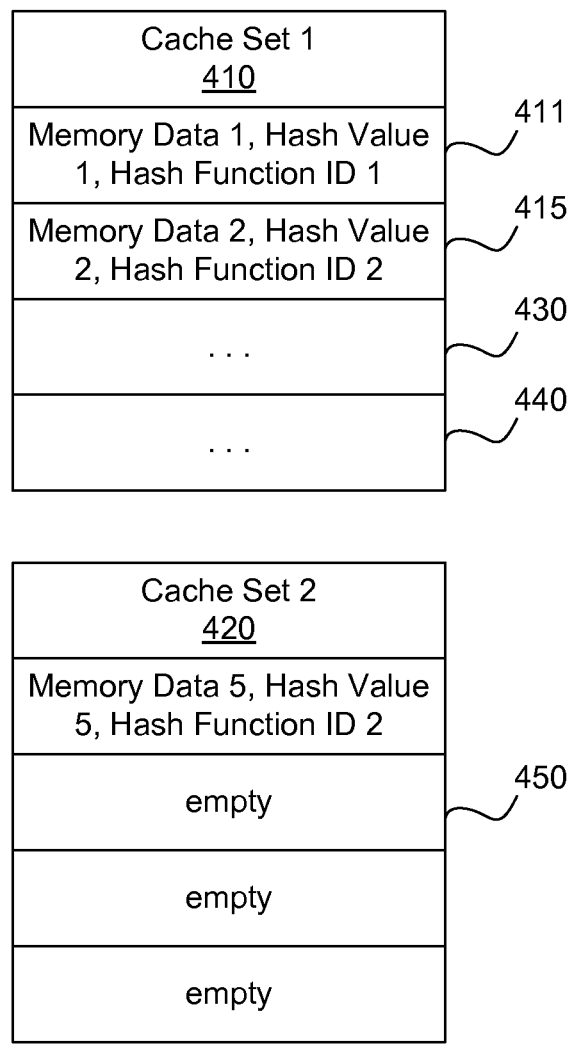
FIG. 4 illustrates example cache sets of a cache memory in accordance with some embodiments in accordance with some embodiments.

FIG. 4 illustrates example cache sets of a cache memory. In general, the example cache sets may correspond to cache sets as described in relation to the hash function selection module 107 or 200 of FIGS. 1 and 2.

As shown in FIG. 4, a cache memory may include a first cache set 410 and a second cache set 420. In some embodiments, each entry or way of the cache set may be used to store a memory data, a portion of the corresponding memory address (e.g., the hash value), and a hash function identification or identity (ID). For example, the way 411 may identify a first memory data, a first hash value, and a first hash function ID 414 and the way 415 may identify a second memory data, a second hash value, and a third hash function ID. The first hash value 413 may correspond to a hash value of the memory address of the first memory data as calculated by a hash function with the first hash function ID. Furthermore, the second hash value may correspond to a hash value of the memory address of the second memory data as calculated by another (different) hash function with the second hash function ID.

The first cache set 410 may further include way 430 and way 440 that are currently storing separate memory data as well. If a subsequent memory data is assigned to the first cache set 410, then at least one of the currently stored memory data in the first cache set 410 may be evicted and stored in main memory as opposed to cache memory. For example, the first memory data in the way 411 may be evicted and stored in main memory and the way 411 may then store the subsequent memory data. In response to the eviction, the first memory data and its corresponding memory address may be stored in main memory. However, the corresponding memory address may be calculated from the first hash value and the first hash function ID and an identification of the first cache set 410. For example, the original corresponding memory address may be calculated by using the hash function with the first hash function ID to calculate the original corresponding memory address from the first hash value and the identification of the first cache set 410. After the calculating of the original corresponding memory address, the first memory data and its corresponding memory address may then be stored in the main memory.

Furthermore, since the assigning of the memory address to the first cache set resulted in the eviction of the memory data that was previously stored in the way 411, the conflict ratio of the cache memory that includes the first cache set 410 and the second cache set 420 may exceed a ratio threshold. Thus, the hash function that is used to assign memory data to the cache set 410 and the cache set 420 may be changed. A subsequent memory data to be stored in the cache memory may then be assigned to one of the cache sets 410 or 420 based on the new hash function. Such a hash function may then store the subsequent memory data in the second cache set 420 as opposed to the first cache set 410. For example, the subsequent memory data and its corresponding hash value may be stored in the empty way 450. Since the second cache set 420 is not full and includes ways that are not currently storing memory data, the storing of the subsequent memory data in the second cache set 420 may not result in the eviction of memory data and the increase in the conflict ratio.

Figure 5:
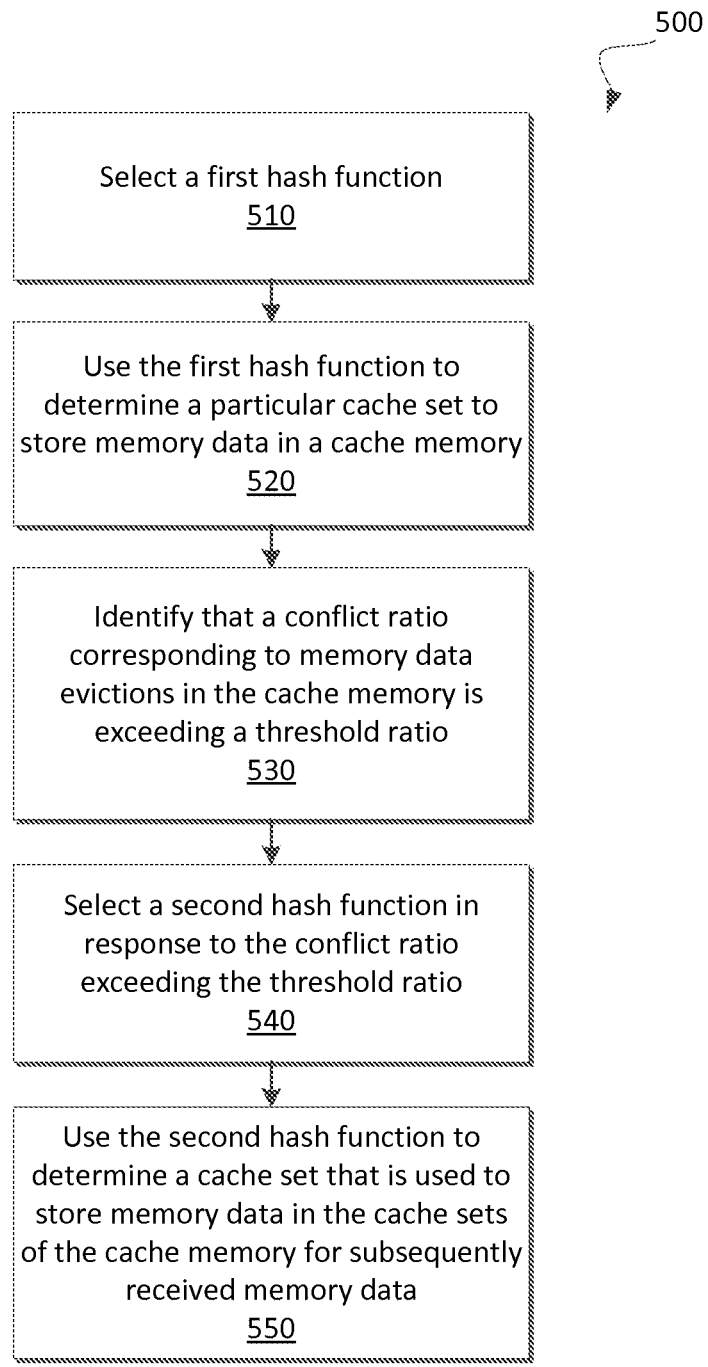
FIG. 5 illustrates an example method to change from a first hash function to a second hash function to compute a set that will be used to store memory data in cache sets in accordance with some embodiments of the disclosure.

FIG. 5 illustrates an example method 500 method to change from a first hash function to a second hash function to store memory data in cache sets. The method 500 may be performed by the hash function selection module 107 or 200. For example, the method 500 may be used by the hash function selection module 107 of FIG. 1 or the hash function selection module 200 of FIG. 2 to determine when to change from a first hash function for assigning memory data to cache sets to a second hash function for assigning memory data to the cache sets. The method 500 may also be performed by processing logic that may comprise hardware (e.g., circuitry, dedicated logic, programmable logic, microcode, etc.), software, firmware, or a combination thereof. Alternatively, other components of the computing system 100 may perform some or all of the operations of the method 500.

As shown in FIG. 5, the method 500 may begin with the processing logic selecting, at block 510, a first hash function. For example, a first hash function may be used to assign memory data to cache sets of a cache memory. The processing logic may further use the first hash function that is used to determine a particular cache set that will be used to store memory data in cache sets of the cache memory (block 520). For example, the first hash function may be used to calculate hash values of memory addresses of memory data when assigning the memory data to one cache set of the cache memory. The processing logic may further identify that a conflict ratio corresponding to memory data evictions in the cache sets of the cache memory is exceeding a threshold ratio (block 530). For example, the assigning of memory data to the cache sets while using the first hash function may result in a conflict ratio exceeding a threshold ratio. In response to the conflict ratio exceeding the threshold ratio, the processing logic may select a second hash function to replace the first hash function (block 540). For example, the second hash function may be used to store subsequent memory data in the cache sets of the cache memory. Furthermore, the processing logic may use the second hash function to store memory data in the cache sets of the cache memory (block 550). For example, subsequently received memory data that is to be stored in the cache memory may be assigned to a particular cache set of the cache memory by using the second hash function instead of the first hash function.

As such, a first hash function may be used to assign memory data to cache sets of a cache memory until a conflict ratio is determined to exceed a threshold ratio. In response to the conflict ratio exceeding the threshold ratio, a second hash function may be used to assign subsequent memory data to the cache sets of the cache memory.

Figure 6:
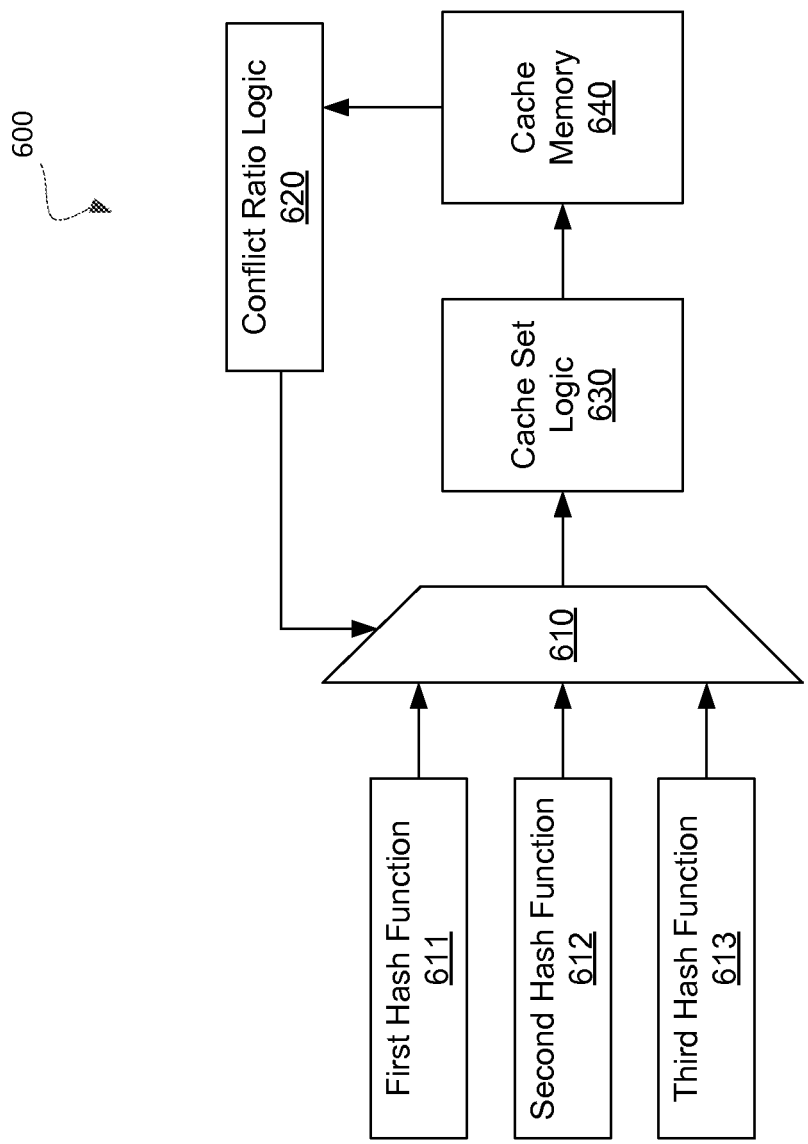
FIG. 6 is an example architecture to change a hash function used to compute a set that will be used to store memory data in cache sets in accordance with some embodiments of the disclosure.

FIG. 6 is an architecture 600 to change a hash function used to store memory data in cache sets a flow diagram of an example method 600 in accordance with some embodiments of the disclosure. In general, the architecture 600 may be used to assign memory data to cache sets as described in relation to the hash function selection module 107 or 200 of FIGS. 1 and 2.

As shown in FIG. 6, the architecture 600 may include a selection unit 610 (e.g., a multiplexer). The selection unit 610 may receive multiple hash functions. For example, the selection unit 610 may receive a first hash function 611, a second hash function 612, and a third hash function 613. Although three hash functions are depicted, any number of hash functions may be used or coupled to the selection unit 610. The selection unit 610 may select one of the first hash function 611, second hash function 612, or third hash function 613 to be used in cache set logic 630 based on a hash function selection ID 621 from conflict ratio logic 620. For example, the conflict ratio logic 620 may identify that a conflict ratio of the cache memory 640 is exceeding a threshold ratio. In response, the conflict ratio logic 620 may change the hash function selection ID 621 so that the selection unit 610 provides another hash function to the cache set logic 630.

As an example, the first hash function 611 may be selected by the selection unit 610 to be used with the cache set logic 630 in response to the hash function selection ID 621 identifying the first hash function 611. The cache set logic 630 may assign memory data to cache sets of the cache memory 640 based on the first hash function 611. After subsequent memory data have been assigned to the cache memory 640, the conflict ratio logic 620 may identify that a conflict ratio of the cache memory 640 is exceeding a threshold ratio. In response, the conflict ratio logic 620 may change the hash function selection ID 621 to identify the second hash function 612. In response to the change of the hash function selection ID 621, the selection unit 610 may not provide the first hash function 611 to the cache set logic 630 and may instead provide the second hash function 612 to the cache set logic 630 for assigning subsequent memory data to the cache sets of the cache memory 640. Furthermore, if the conflict ratio logic 620 determines that the conflict ratio is still exceeding the threshold ratio, then the conflict ratio logic 620 may change the hash function selection ID 621 to identify the third hash function 613 that is then selected by the selection unit 610 and provided to the cache set logic 630.

Figure 7:
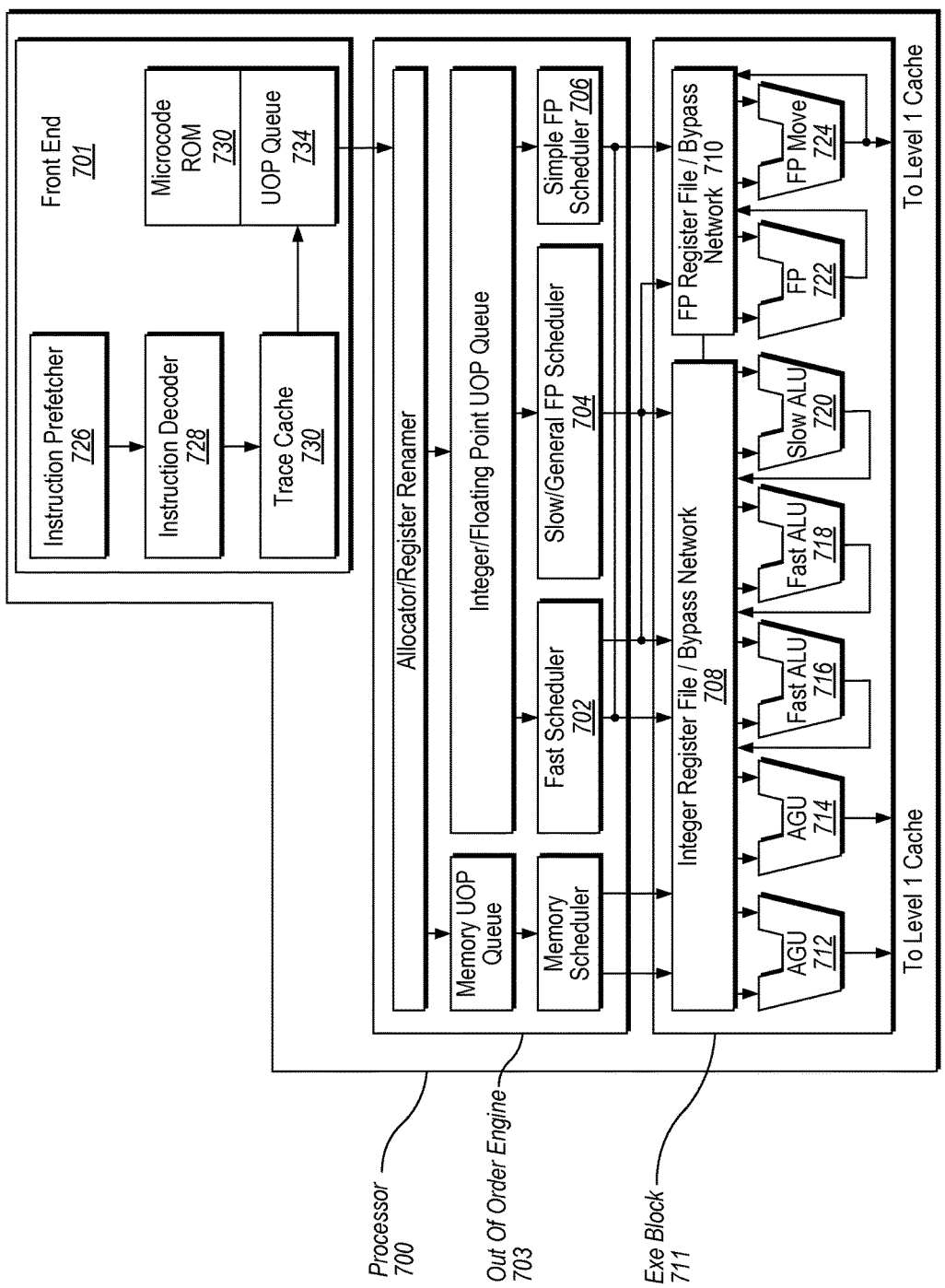
FIG. 7 illustrates a block diagram of the micro-architecture for a processor that includes logic circuits to change a hash function used to store memory data in cache sets according to one embodiment.

FIG. 7 illustrates a block diagram of the micro-architecture for a processor 700 that includes logic circuits to select a hash function according to one embodiment. The hash function selection module 107 and 200 may be implemented in the processor 700. In some embodiments, an instruction in accordance with one embodiment can be implemented to operate on data elements having sizes of byte, word, double-word, quadword, etc., as well as data types, such as single and double precision integer and floating point data types. In one embodiment the in-order front end 701 is the part of the processor 700 that fetches instructions to be executed and prepares them to be used later in the processor pipeline.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution. In some embodiments, the out-of-order execution engine 703 and the exe block 711 may notify a retirement unit with regard to the allocation and completion/execution of an instruction.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to manage checkpoints of an out of order architecture according to one embodiment. In one embodiment, the execution block 711 of processor 700 may include the checkpoint module 200, to manage checkpoints of an out of order architecture according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
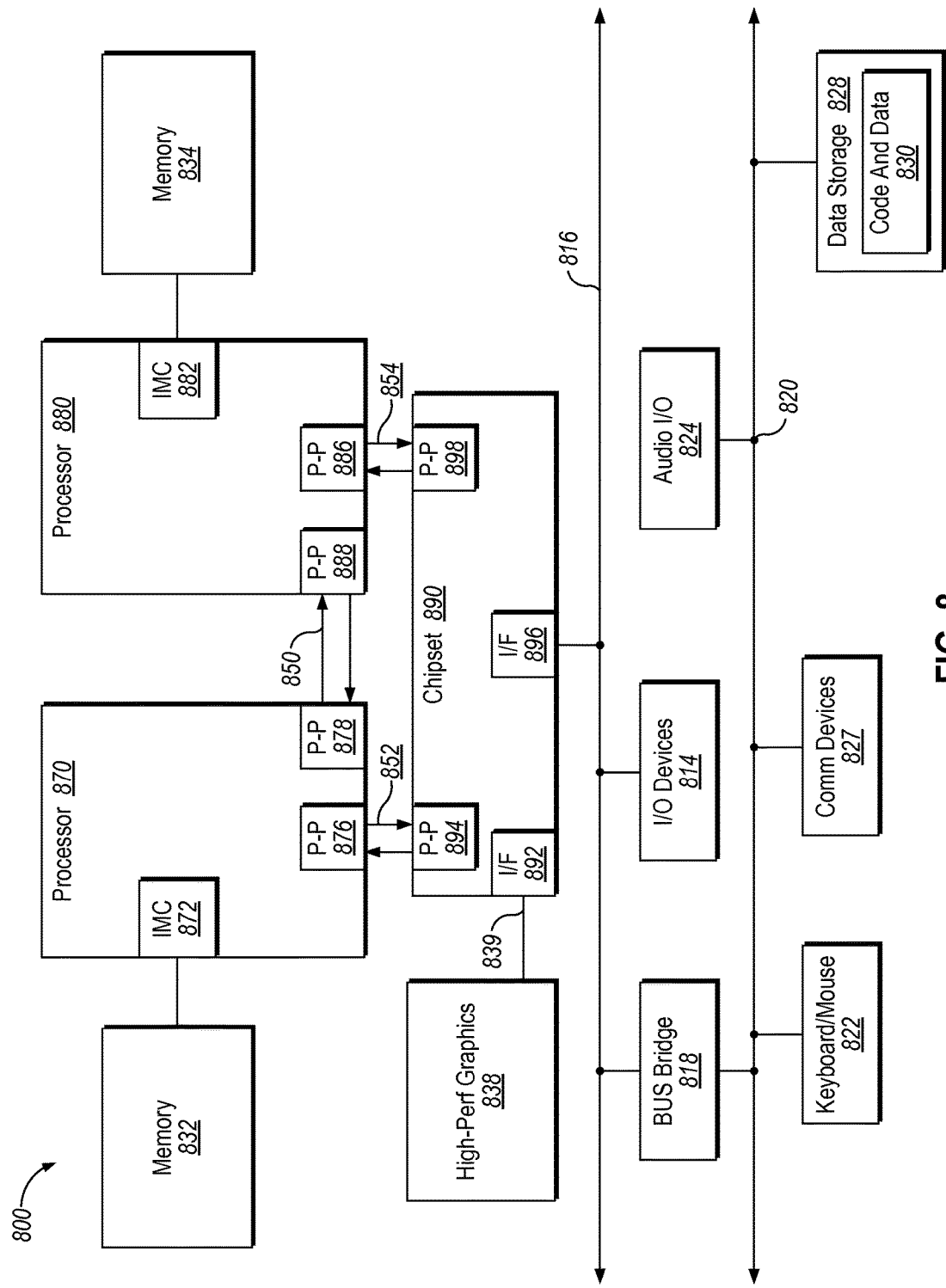
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores, although potentially many more cores may be present in the processors. The processors each may include hybrid write mode logics in accordance with an embodiment of the present. In some embodiments, the hash function selection modules 107 and 200 may be implemented in the multiprocessor system 800. For example, the hash function selection modules 107 and 200 may be implemented in the processor 870 and/or the processor 880.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
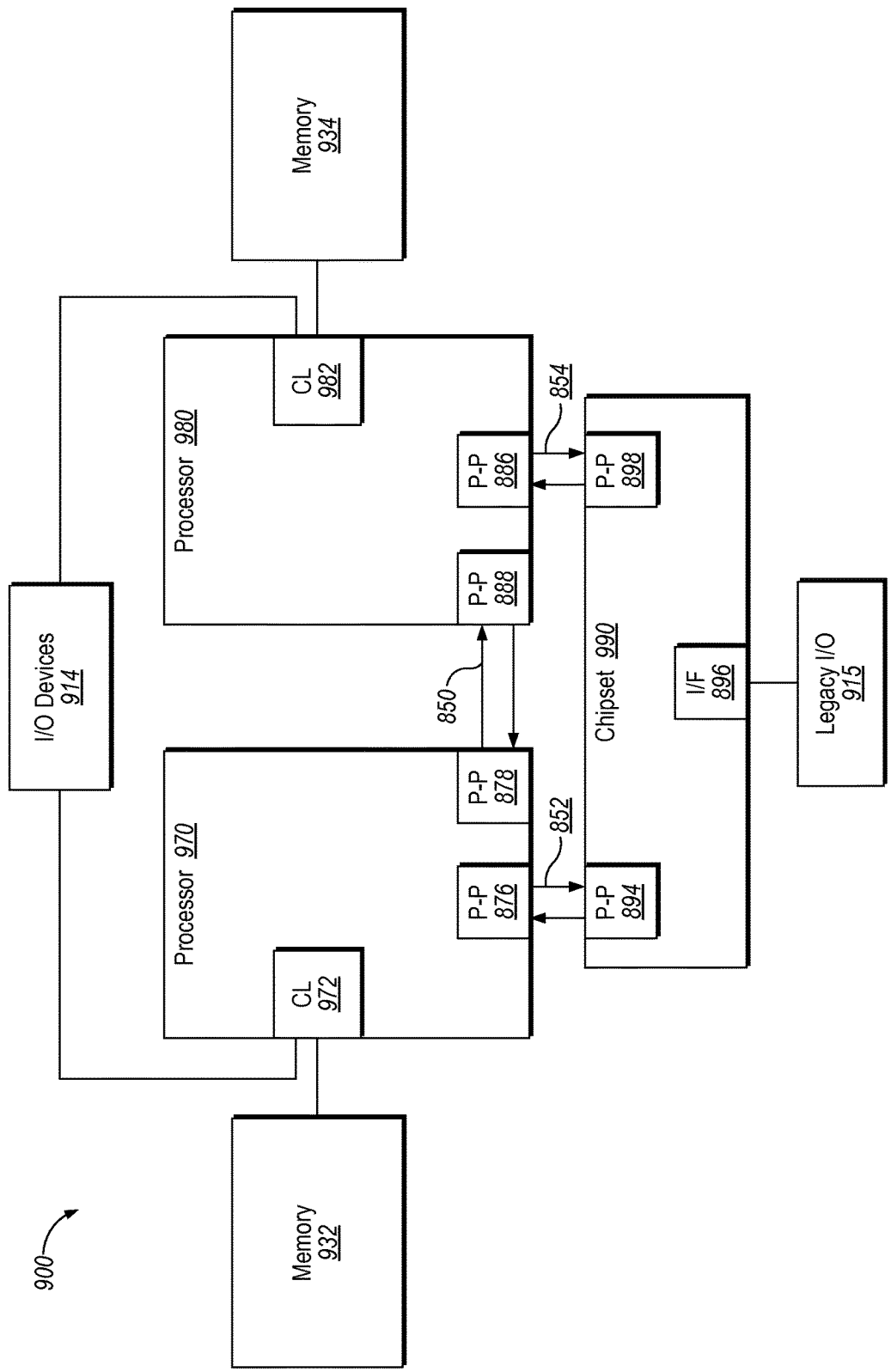
FIG. 9 is a block diagram of a computer system according to another implementation.

Referring now to FIG. 9, shown is a block diagram of a third system 900 in accordance with an embodiment of the present disclosure. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 915 are also coupled to the control logic 972, 982. Legacy I/O devices 915 are coupled to the chipset 990. In some embodiments, the hash function selection interruption modules 107 and 200 may be implemented in the system 900. For example, the hash function selection modules 107 and 200 may be implemented in the processor 970 and/or the processor 980.

Figure 10:
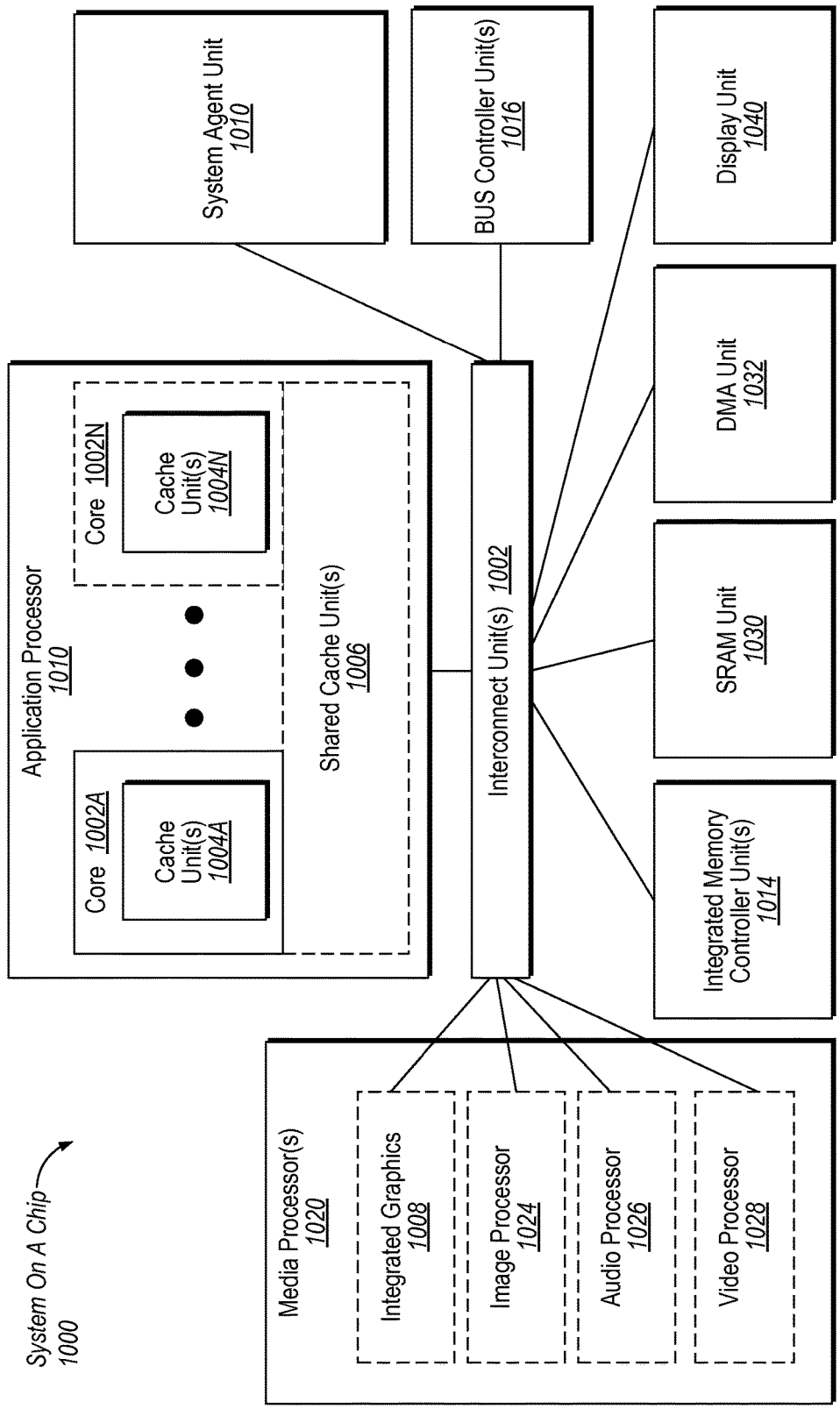
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Similar elements in FIG. 10 bear like reference numerals. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. In some embodiments, the hash function selection modules 107 and 200 may be implemented in the SoC 1000. For example, the hash function selection modules 107 and 200 may be implemented in the application processor 1010 and/or cores 1002A-N.

Figure 11:
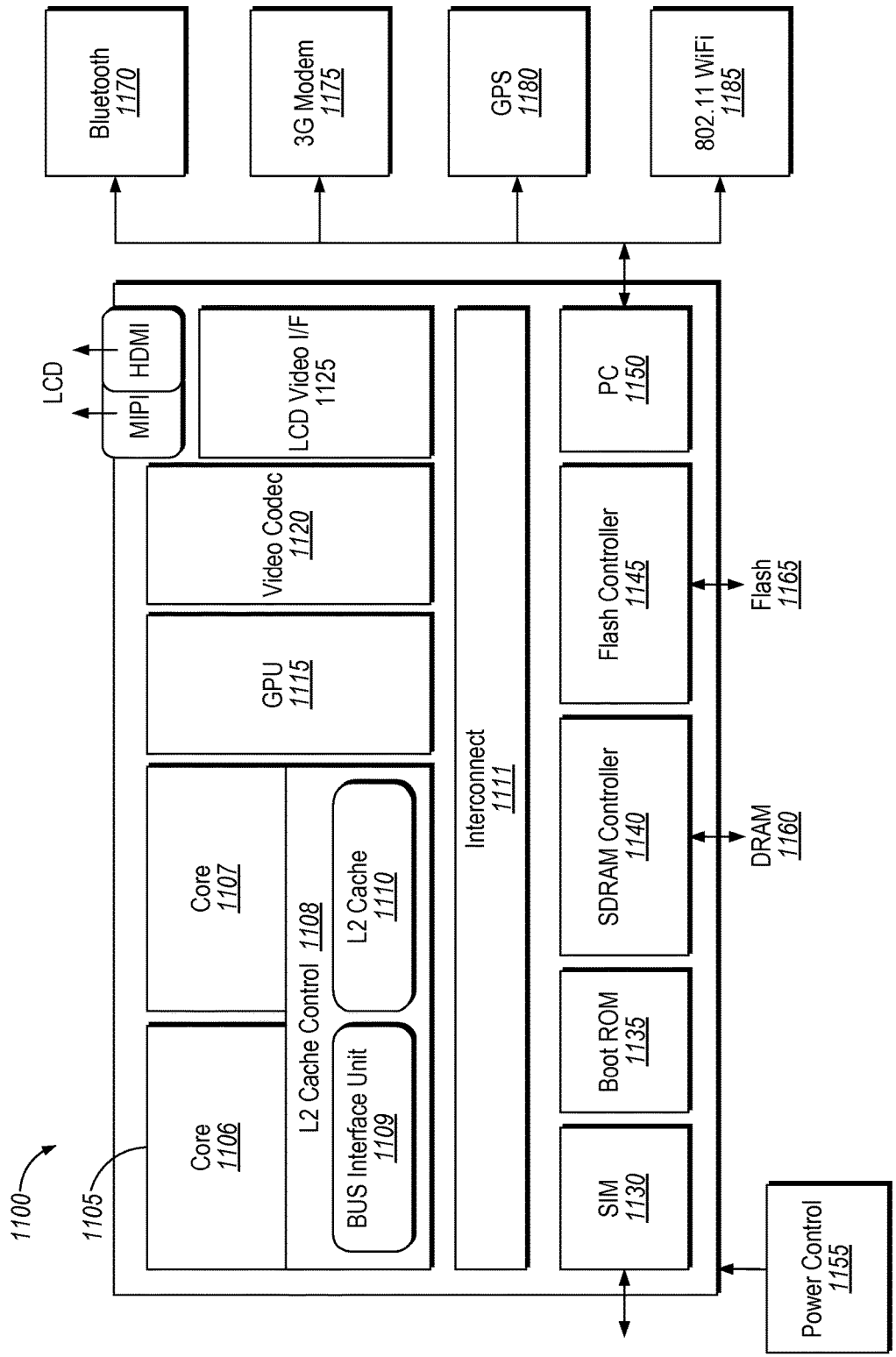
FIG. 11 illustrates another implementation of a block diagram for a computing system.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. In some embodiments, the hash function selection modules 107 and 200 may be implemented in the SCC 1100. For example, the hash function selection modules 107 and 200 may be implemented in the core 1106 and/or core 1107.

Here, SOC 1100 includes two cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
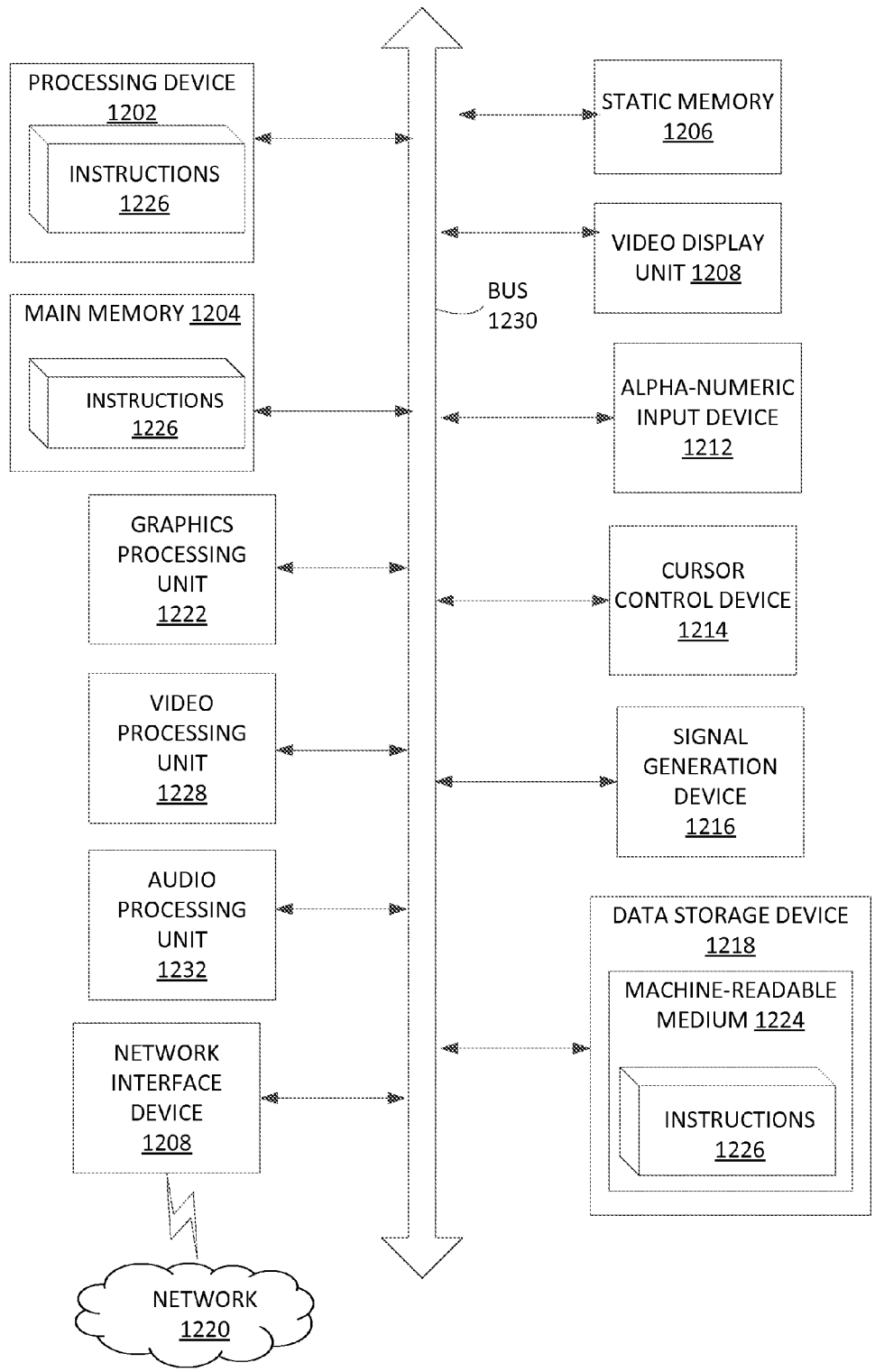
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230. In some embodiments, the hash function selection modules 107 and 200 may be implemented in the system 1200. For example, the hash function selection modules 107 and 200 may be implemented in the processing device 1202 and/or be stored in the instructions 1226.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising a memory, one or more functional units coupled to the memory, and a hash function selection module coupled to the memory and the one or more functional units and to receive data and a memory address associated with the data, calculate a hash value of the memory address by using a first hash function, store the data at a cache set of a plurality of cache sets of a cache memory based on the hash value calculated from the first hash function, determine whether the storing of the data at the cache set of the plurality of cache sets of the cache memory is associated with a conflict ratio of the cache memory exceeding a threshold ratio, and in response to the conflict ratio exceeding the threshold ratio, calculate a second hash value of a second memory address associated with a second data by using a second hash function that is different than the first hash function.

In Example 2, in the processor of Example 1, the hash function selection is further, calculate the second hash value of a second memory address associated with the second data by using the same first hash function to in response to the conflict ratio not exceeding the threshold ratio.

In Example 3, in the processor of any of Examples 1-2, the hash function selection module is further to identify the cache set of the plurality of cache sets based on a portion of the hash value calculated from the first hash function.

In Example 4, in the processor of any of Examples 1-3, the conflict ratio is associated with a rate of eviction for memory previously stored in the cache memory.

In Example 5, in the processor of any of Examples 1-4, an eviction corresponding to the rate of eviction is associated with a removal of a previously stored memory from the cache set of the cache memory in response to the storing of the data at the cache set of the plurality of cache sets of the cache memory when the cache set is full.

In Example 6, in the processor of any of Examples 1-5, the hash selection module is further to store the hash value of the memory address with the memory at the cache set of the plurality of cache sets and store an identification of the first hash function with the hash value and the data at the cache set of the plurality of cache sets.

In Example 7, in the processor of any of Examples 1-6, the hash value of the memory address, the data, and the identification of the first hash function are stored in a single way of the cache set.

In Example 8, in the processor of any of Examples 1-7, the hash selection module is further to calculate the memory address of the data based on the hash value, an identification of the cache set storing the data, and the identification of the first hash function in response to an eviction of the data stored in the single way of the cache set.

In Example 9, in the processor of any of Examples 1-8, the use of the second hash function distributes memory among the cache sets of the cache memory differently than the use of the first hash function.

In Example 10, a method comprises receiving data and a memory address associated with the data, calculating a hash value of the memory address by using a first hash function, storing the data at a cache set of a plurality of cache sets of a cache memory based on the hash value calculated from the first hash function, determining, by a hash selection module of a processor, whether the storing of the data at the cache set of the plurality of cache sets of the cache memory is associated with a conflict ratio of the cache memory exceeding a threshold ratio, and in response to the conflict ratio exceeding the threshold ratio, calculating a second hash value of a second memory address associated with a second data by using a second hash function that is different than the first hash function.

In Example 11, in the method of Example 10, the method further comprises in response to the conflict ratio not exceeding the threshold ratio, calculating the second hash value of a second memory address associated with the second data by using the same first hash function.

In Example 12, in the method of any of Examples 10-11, the method further comprises identifying the cache set of the plurality of cache sets based on a portion of the hash value calculated from the first hash function.

In Example 13, in the method of any of Examples 10-12, the conflict ratio is associated with a rate of eviction for memory previously stored in the cache memory.

In Example 14, in the method of any of Examples 10-13, an eviction corresponding to the rate of eviction is associated with a removal of a previously stored memory from the cache set of the cache memory in response to the storing of the data at the cache set of the plurality of cache sets of the cache memory when the cache set is full.

In Example 15, in the method of any of Examples 10-14, the method further comprises storing the hash value of the memory address with the memory at the cache set of the plurality of cache sets and storing an identification of the first hash function with the hash value and the data at the cache set of the plurality of cache sets.

In Example 16, in the method of any of Examples 10-15, the hash value of the memory address, the data, and the identification of the first hash function are stored in a single way of the cache set.

In Example 17, in the method of any of Examples 10-16, the method further comprises in response to an eviction of the data stored in the single way of the cache set, calculating the memory address of the data based on the hash value, an identification of the cache set storing the data, and the identification of the first hash function.

In Example 18, in the method of any of Examples 10-17, the use of the second hash function distributes memory among the cache sets of the cache memory differently than the use of the first hash function.

Various embodiments may have different combinations of the structural features described above. For instance, all optional features of the processors and methods described above may also be implemented with a processor described herein and specifics in the examples may be used anywhere in one or more embodiments.

Example 19 is an integrated circuit comprising a processor core and a hash function selection module associated with the processor core to receive data and a memory address associated with the data, calculate a hash value of the memory address by using a first hash function, store the data at a cache set of a plurality of cache sets of a cache memory based on the hash value calculated from the first hash function, determine whether the storing of the data at the cache set of the plurality of cache sets of the cache memory is associated with a conflict ratio of the cache memory exceeding a threshold ratio, and in response to the conflict ratio exceeding the threshold ratio, calculate a second hash value of a second memory address associated with a second data by using a second hash function that is different than the first hash function.

In Example 20, in the integrated circuit of Example 19, the hash function selection module is further to in response to the conflict ratio not exceeding the threshold ratio, calculate the second hash value of a second memory address associated with the second data by using the same first hash function.

In Example 21, in the integrated circuit of any of Examples 19-20, the hash function selection module is further to identify the cache set of the plurality of cache sets based on a portion of the hash value calculated from the first hash function.

In Example 22, in the integrated circuit of any of Examples 19-21, the conflict ratio is associated with a rate of eviction for memory previously stored in the cache memory, and an eviction corresponding to the rate of eviction is associated with a removal of a previously stored memory from the cache set of the cache memory in response to the storing of the data at the cache set of the plurality of cache sets of the cache memory when the cache set is full.

In Example 23, in the integrated circuit of any of Examples 19-22, the hash selection module is further to store the hash value of the memory address with the memory at the cache set of the plurality of cache sets, store an identification of the first hash function with the hash value and the data at the cache set of the plurality of cache sets, wherein the hash value of the memory address, the data, and the identification of the first hash function are stored in a single way of the cache set, and in response to an eviction of the data stored in the single way of the cache set, calculating the memory address of the data based on the hash value, an identification of the cache set storing the data, and the identification of the first hash function.

Various embodiments may have different combinations of the operational features described above. For instance, all optional features of the method described above may also be implemented with respect to a non-transitory computer-readable storage medium. Specifics in the examples may be used anywhere in one or more embodiments.

Example 24 is a non-transitory machine-readable storage medium including instructions that, when executed by a processor, cause the processor to perform the method of Examples 10-18.

Example 25 is a system on a chip (SOC) comprising a plurality of functional units and a hash function selection module, coupled to the functional units, to receive data and a memory address associated with the data, calculate a hash value of the memory address by using a first hash function, store the data at a cache set of a plurality of cache sets of a cache memory based on the hash value calculated from the first hash function, determine whether the storing of the data at the cache set of the plurality of cache sets of the cache memory is associated with a conflict ratio of the cache memory exceeding a threshold ratio, and in response to the conflict ratio exceeding the threshold ratio, calculate a second hash value of a second memory address associated with a second data by using a second hash function that is different than the first hash function.

In Example 26, the SOC of Example 25 further comprises the subject matter of Examples 1-9.

In Example 27, the SOC of Example 25, the hash function selection module is further operable to perform the subject matter of Examples 10-18.

In Example 28, the SOC of Example 25 further comprises the subject matter of Examples 19-23.

Example 29 is an apparatus comprising means for receiving data and a memory address associated with the data, calculating a hash value of the memory address by using a first hash function, means for storing the data at a cache set of a plurality of cache sets of a cache memory based on the hash value calculated from the first hash function, means for determining, by a hash selection module of a processor, whether the storing of the data at the cache set of the plurality of cache sets of the cache memory is associated with a conflict ratio of the cache memory exceeding a threshold ratio, and means for in response to the conflict ratio exceeding the threshold ratio, means for calculating a second hash value of a second memory address associated with a second data by using a second hash function that is different than the first hash function.

In Example 30, the apparatus of Example 29 further comprises the subject matter of any of Examples 1-9 and 20-23.

Example 31 is an apparatus comprising a hash function selection module, where the hash function selection module is configured to perform the method of any of Examples 10-18.

In Example 32, the apparatus of Example 31 further comprises the subject matter of any of Examples 1-9 and 19-28.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to cache memory data compression and decompression in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, and 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a memory;
   one or more functional units coupled to the memory; and
   a hash function selection module coupled to the memory and the one or more functional units and to:
   receive data and a memory address associated with the data;
   calculate a hash value of the memory address by using a first hash function;
   store the data at a cache set of a plurality of cache sets of a cache memory based on the hash value calculated from the first hash function;
   determine whether the storing of the data at the cache set of the plurality of cache sets of the cache memory is associated with a conflict ratio of the cache memory exceeding a threshold ratio; and
   in response to the conflict ratio exceeding the threshold ratio, calculate a second hash value of a second memory address associated with a second data by using a second hash function that is different than the first hash function.

2. The processor of claim 1, wherein the hash function selection module is further to:
   in response to the conflict ratio not exceeding the threshold ratio, calculate the second hash value of the second memory address associated with the second data by using the same first hash function.

3. The processor of claim 1, wherein the hash function selection module is further to:
   identify the cache set of the plurality of cache sets based on a portion of the hash value calculated from the first hash function.

4. The processor of claim 1, wherein the conflict ratio is associated with a rate of eviction for memory previously stored in the cache memory.

5. The processor of claim 4, wherein an eviction corresponding to the rate of eviction is associated with a removal of a previously stored memory from the cache set of the cache memory in response to the storing of the data at the cache set of the plurality of cache sets of the cache memory when the cache set is full.

6. The processor of claim 1, wherein the hash function selection module is further to:
   store the hash value of the memory address with the memory at the cache set of the plurality of cache sets; and
   store an identification of the first hash function with the hash value and the data at the cache set of the plurality of cache sets.

7. The processor of claim 6, wherein the hash value of the memory address, the data, and the identification of the first hash function are stored in a single way of the cache set.

8. The processor of claim 7, wherein the hash function selection module is further to:
in response to an eviction of the data stored in the single way of the cache set, calculate the memory address of the data based on the hash value, an identification of the cache set storing the data, and the identification of the first hash function.

9. The processor of claim 1, wherein the use of the second hash function distributes memory among the cache sets of the cache memory differently than the use of the first hash function.

10. A method comprising:
receiving data and a memory address associated with the data;
calculating a hash value of the memory address by using a first hash function;
storing the data at a cache set of a plurality of cache sets of a cache memory based on the hash value calculated from the first hash function;
determining, by a hash function selection module of a processor, whether the storing of the data at the cache set of the plurality of cache sets of the cache memory is associated with a conflict ratio of the cache memory exceeding a threshold ratio; and
in response to the conflict ratio exceeding the threshold ratio, calculating a second hash value of a second memory address associated with a second data by using a second hash function that is different than the first hash function.

11. The method of claim 10, further comprising:
in response to the conflict ratio not exceeding the threshold ratio, calculating the second hash value of the second memory address associated with the second data by using the same first hash function.

12. The method of claim 10, further comprising:
identifying the cache set of the plurality of cache sets based on a portion of the hash value calculated from the first hash function.

13. The method of claim 10, wherein the conflict ratio is associated with a rate of eviction for memory previously stored in the cache memory.

14. The method of claim 13, wherein an eviction corresponding to the rate of eviction is associated with a removal of a previously stored memory from the cache set of the cache memory in response to the storing of the data at the cache set of the plurality of cache sets of the cache memory when the cache set is full.

15. The method of claim 10, further comprising:
storing the hash value of the memory address with the memory at the cache set of the plurality of cache sets; and
storing an identification of the first hash function with the hash value and the data at the cache set of the plurality of cache sets.

16. The method of claim 15, wherein the hash value of the memory address, the data, and the identification of the first hash function are stored in a single way of the cache set.

17. The method of claim 16, wherein the method further comprises:
in response to an eviction of the data stored in the single way of the cache set, calculating the memory address of the data based on the hash value, an identification of the cache set storing the data, and the identification of the first hash function.

18. The method of claim 10, wherein the use of the second hash function distributes memory among the cache sets of the cache memory differently than the use of the first hash function.

19. An integrated circuit comprising:
a processor core; and
a hash function selection module associated with the processor core and to:
receive data and a memory address associated with the data;
calculate a hash value of the memory address by using a first hash function;
store the data at a cache set of a plurality of cache sets of a cache memory based on the hash value calculated from the first hash function;
determine whether the storing of the data at the cache set of the plurality of cache sets of the cache memory is associated with a conflict ratio of the cache memory exceeding a threshold ratio; and
in response to the conflict ratio exceeding the threshold ratio, calculate a second hash value of a second memory address associated with a second data by using a second hash function that is different than the first hash function.

20. The integrated circuit of claim 19, wherein the hash function selection module is further to:
in response to the conflict ratio not exceeding the threshold ratio, calculate the second hash value of the second memory address associated with the second data by using the same first hash function.

21. The integrated circuit of claim 19, wherein the hash function selection module is further to:
identify the cache set of the plurality of cache sets based on a portion of the hash value calculated from the first hash function.

22. The integrated circuit of claim 19, wherein the conflict ratio is associated with a rate of eviction for memory previously stored in the cache memory, and wherein an eviction corresponding to the rate of eviction is associated with a removal of a previously stored memory from the cache set of the cache memory in response to the storing of the data at the cache set of the plurality of cache sets of the cache memory when the cache set is full.

23. The integrated circuit of claim 19, wherein the hash selection module is further to:
store the hash value of the memory address with the memory at the cache set of the plurality of cache sets;
store an identification of the first hash function with the hash value and the data at the cache set of the plurality of cache sets, wherein the hash value of the memory address, the data, and the identification of the first hash function are stored in a single way of the cache set; and
in response to an eviction of the data stored in the single way of the cache set, calculating the memory address of the data based on the hash value, an identification of the cache set storing the data, and the identification of the first hash function.

* * * * *